March 18, 1958 — C. M. BALLARD ET AL — 2,827,210
LIQUID DISPENSER

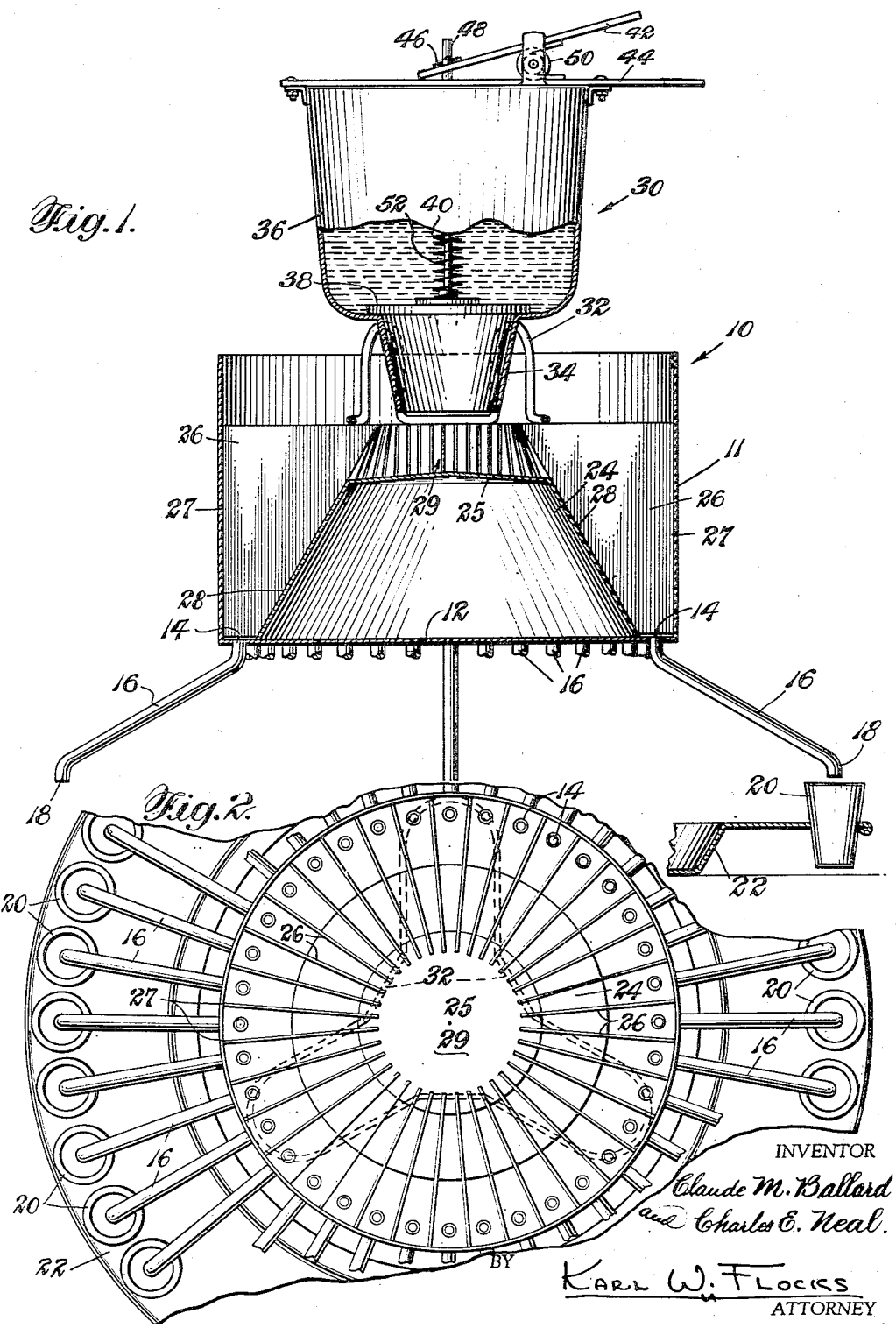

Filed June 3, 1955 — 2 Sheets-Sheet 2

INVENTORS
Claude M. Ballard
and Charles E. Neal.
BY Karl W. Flocks
ATTORNEY

United States Patent Office 2,827,210
Patented Mar. 18, 1958

2,827,210

LIQUID DISPENSER

Claude M. Ballard and Charles E. Neal, Memphis, Tenn.

Application June 3, 1955, Serial No. 512,916

10 Claims. (Cl. 222—478)

The present invention relates to apparatus for filling receptacles with a liquid. More particularly, the present invention relates to receptacle filling apparatus for particular use with a communion tray whereby a proportioned amount of liquid is directed into a plurality of communion cups.

The present invention is adapted for particular use in religious ceremonies, although it is understood that the filling apparatus embodied herein may be utilized for other purposes related to the simultaneous filling of a plurality of receptacles. In religious services, it is frequently necessary to provide communion cups, each of which is filled with a small amount of liquid, to a large number of people. Prior to the instant invention, it has been the custom to manually fill each communion cup individually, which procedure was normally considerably time-consuming and also generally resulted in an excess of the fluid being utilized. It is desirable in such ceremonies to fill a large number of communion cups simultaneously and rapidly and only utilizing the required amount of liquid. Therefore, it is an object of the present invention to provide a communion cup filling device which is adapted to direct a liquid to a plurality of communion cups simultaneously and in equal proportions.

Another object of the present invention is to provide communion cup filling apparatus which includes distributing means for dispensing an equal amount of liquid to the communion cups regardless of the amount of liquid introduced into the apparatus.

Still another object of the present invention is to provide a communion cup filling apparatus which includes a control device for metering the flow of liquid to the liquid dispensing means.

Still another object of the present invention is to provide a communion cup filler wherein a plurality of communion cups are simply and quickly filled with an equal quantity of liquid.

Other objects and the nature and advantages of the instant invention will be apparent from the following description taken in conjunction with the accompanying drawings, wherein:

Fig. 1 is a vertical sectional view of one form of the communion cup filling apparatus embodied in the present invention;

Fig. 2 is a top plan view of the apparatus illustrated in Fig. 1;

Figure 3:
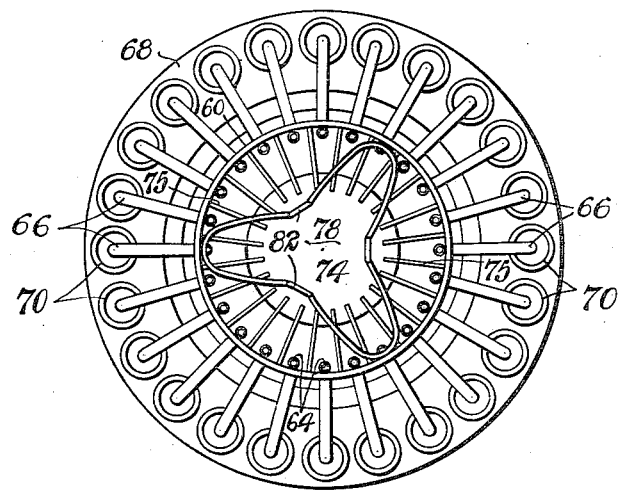
Fig. 3 is a top plan view of a modified form of the communion cup filling apparatus embodied herein.

Referring now to the drawings, and particularly Figs. 1 and 2, one form of the present invention is illustrated therein and includes a container generally indicated at 10. The container 10 is circular in construction and includes a continuous side wall 11, an open top, and a bottom wall 12 which is provided with a plurality of openings 14. As shown in Fig. 2, the openings 14 extend around the entire bottom wall 12 of the container 10 and are spaced a predetermined distance apart, depending upon the number of communion cups desired to be filled in one filling operation. In the present invention, thirty-six openings 14 are illustrated, thereby providing for the simultaneous filling of thirty-six communion cups, but it should be understood that any number of openings 14 may be provided, depending upon the diameter of the container bottom wall 12. Communicating with the openings 14 and secured to the bottom wall 12 are a plurality of flexible tubular extensions or fluid dispensing tubes 16 which are adapted to radiate outwardly from the container 10 and are formed with a downwardly extending nozzle 18 on the outermost end thereof. The tubes 16 are adapted to direct liquid from the container 10 to a plurality of communion cups 20, which are illustrated in Figs. 1 and 2 as being positioned in suitable openings in a tray or receptacle 22. As shown in Fig. 2, the tray 22 is circular in construction and is adapted to be formed with the same number of communion cup openings as there are dispensing tubes 16, each cup 20 being positioned directly below a nozzle 18 of the fluid dispensing tubes. It is understood that the container 10 is supported by some convenient support which does not form part of the invention and, therefore is not illustrated.

Positioned within the container 10 and secured to the bottom wall 12 thereof is an inner member 24 that is formed in substantially a truncated cone configuration. The inner member 24 is formed with a top wall 25 that has a slight conical configuration and is thereby adapted to direct liquid toward the sides of the container 10 and downwardly toward the openings 14, as will hereinafter be described.

In order to equally proportion the amount of liquid directed into each of the communion cups 20, a plurality of cells are formed, the cells being defined by a plurality of partitions 26. Each of the partitions 26 is formed with a vertical edge 27 that is secured to the side wall 11 of the container 10 and an inclined edge 28 that is secured to the inclined side of the truncated inner member 24. As shown in Fig. 2, the partitions 26 are spaced around the container in such a manner so that each of the openings 14 is positioned between a pair of partitions 26. The cells thus defined by the side wall 11 of the container 10, the partitions 26 and the inner member 24 are adapted to receive liquid therein in equal proportions and direct the liquid to the bottom thereof and then through the openings 14 for dispensing into the communion cups 20. As shown more clearly in Fig. 1, the partitions 26 extend upwardly beyond the top wall 25 of the inner member 24 and thus define with the top wall 25 of the inner member 24 a fluid distributing chamber 29. The side wall 11 of the container 10 further extends substantially above the partitions 26 and thus forms a retaining wall for preventing escape of the liquid that may be splashed when it is poured into the distributing chamber 29.

In order or deliver the communion liquid automatically and in measured quantity to the liquid distributing chamber 29, a delivery cup generally indicated at 30 is provided. The delivery cup 30 is adapted to be supported centrally of the container 10 by a support bracket 32 which, as shown in Fig. 2, is formed with legs that extend outwardly to define a triangular configuration, thereby providing for solid support of the delivery cup. The triangular leg support 32 is formed with an open center section which is adapted to receive therein a lower neck or dispensing portion 34 of the delivery cup 30. Formed integral with the lower neck portion 34 and extending upwardly therefrom is a liquid receiving chamber 36 of the delivery cup 30, the liquid receiving chamber 36 engaging the support 32 and being supported thereby. In order to meter the flow of the communion liquid to the distributing chamber 29 of the container 10, the delivery cup 30 is provided with a control device which includes a valve 38 to which is secured a valve stem 40. The valve 38 is normally seated above the neck portion 34 of the delivery cup 30 and engages the bottom wall of the liquid receiving chamber 36, thereby sealing the opening between the neck portion 34 and liquid receiving chamber 36. The valve stem 40 extends upwardly from the valve 38 and above the topmost end of the liquid receiving chamber 36 of the delivery cup 30 through openings formed in a pair of clamping members 42 and 44, the clamping member 44 being secured across the top of the liquid receiving chamber 36. The stem 40 is secured to the clamping member 42 by a collar 46 and a pin 48 and is adapted to be reciprocated by the clamping member 42. As shown in Fig. 1, the clamping member 42 is retained in the normally closed position and held thereby by a spring 50 interposed between the clamping members. A compression spring 52 surrounds the stem 40 and engages the valve 38 and the lower surface of the clamping member 44. It is seen that upon depressing the end portion of the clamping member 42 against the action of the spring 50, the valve 38 will be raised to allow liquid to flow from the liquid receiving chamber 36 of the delivery cup 30 into the liquid distributing chamber 29. It is apparent that the support bracket 32 is positioned centrally of the distributing chamber 29 so that the liquid flowing therein will be distributed in equal proportions to the cells in the container 10. Upon release of the clamping member 42, the spring 52 will cause the valve 38 to be seated on the bottom wall of the liquid receiving chamber 36 of the delivery cup 30 and thereby cut off the flow of the liquid to the distributing chamber 29.

In operation, when the communion cups 20 are to be filled in connection with a religious service, or the like, wine or a similar beverage is poured into the delivery cup that may be provided with a measuring line or indicator on the inner surface of the wall of the liquid receiving chamber 36. With the communion cups placed in position in the tray 22 and located below the nozzles 18 of the dispensing tubes 16, the clamping member 42 of the delivery cup 30 is depressed to permit the liquid to be discharged into the distributing chamber 29 of the container 10. The liquid strikes the conical upper wall 25 of the inner member 24 and is directed in equal proportions to the cells defined by the partitions 26. Due to the fact that the flow of the liquid from the delivery cup 30 to the cells is unimpeded and the distance of travel is short, surface tension normally associated with flow of small quantities of liquid is overcome and the liquid is distributed to the cells in equal amounts. Once the liquid is trapped in each individual cell, the rate of flow in each cell and associated dispensing tube 16 may not be equal, but since each cell is sealed from an adjacent cell, the variation in rate of flow is unimportant, the equal amounts of trapped liquid eventually being dispensed to the individual communion cups.

Figures 4, 5:
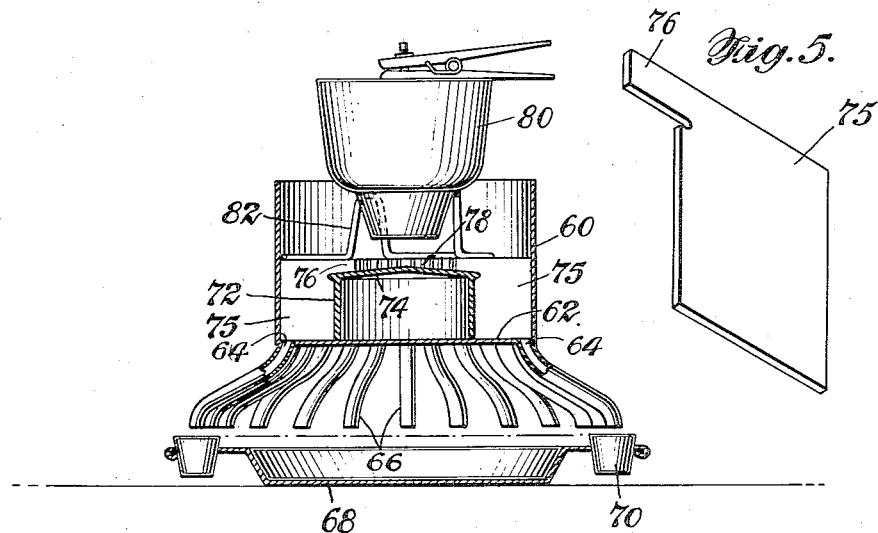
Fig. 4 is a vertical sectional view of the apparatus illustrated in Fig. 3 with parts shown in elevation.
Fig. 5 is a perspective view of one of the partitions of the communion cup filler receptacle shown in Figs. 3 and 4.

Referring now to Figs. 3–5, a modification of the present invention is illustrated and includes substantially the structure described above in connection with Figs. 1 and 2. As shown in Fig. 4, a container 60 is formed with an open top and is provided with a bottom wall 62. The bottom wall 62 is formed with a plurality of spaced openings 64 therein, each of the openings communicating with a dispensing tube 66 and the dispensing tubes 66 being secured to the bottom wall 62. A communion cup receptacle 68 of circular configuration is adapted to retain therein a plurality of cups 70, each of the cups 70 being associated with one of the dispensing tubes 66.

The container 60 is formed with an inner member 72 which is formed with vertical side walls and an upper wall 74 that has a slight conical configuration. In order to partition the container 60 into a plurality of cells, partitions 75 are provided, being formed in the configuration illustrated in Fig. 5. The partitions 75 are secured to the side walls of the container 60 and to the vertical wall and a portion of the upper conical wall 74 of the inner member 72. As shown in Fig. 5, the partitions 75 are formed with an outwardly extending tongue 76 which engages a portion of the upper conical wall of the inner member 62 and defines with an adjacent tongue a channel for directing liquid into the cells. Formed between the partitions 75 is a liquid distributing chamber 78 which is adapted to receive liquid from a convenient source, such as a delivery cup 80, the cup being formed similarly to the cup 30 described above in connection with Figs. 1 and 2. A convenient support 82 is adapted to rest on the top edges of the partitions 75, the support 82 being similar to the support 32 described above in connection with Figs. 1 and 2 and adapted to support the delivery cup 80 centrally of the liquid distributing chamber 78. It is seen that when the delivery cup 80 is filled with a liquid and the clamping members of the valve operating device associated therewith are depressed, the liquid will be directed into the liquid distributing chamber 78 from where it is distributed in equal proportions to the cells defined by the partitions 75. The liquid is then directed from the cells to the liquid dispensing tubes 66 from where it is dispensed into the cups 70 positioned in the tray 68.

Since normally only a small amount of liquid is necessary for the religious ceremony involved, a large number of cups may be filled by the cup filling apparatus described herein. The apparatus distributes the liquid in equal proportions to all of the cups and thus prevents waste in individual filling and furthermore provides a simple and quick method of filling a plurality of cups in a single operation. It is seen that by utilizing the present invention, several operations of the valve device disposed in the delivery cup 30 will dispense liquid to a plurality of communion cups in a very short period of time. Thus, since individual filling of these cups is avoided, the liquid will not be wasted and the required amount of liquid will be dispensed as desired.

It will be obvious to those skilled in the art that various changes may be made without departing from the spirit of the invention and therefore the invention is not limited to what is shown in the drawings and described in the specification but only as indicated in the appended claims.

What is claimed is:

1. In liquid dispensing apparatus, a container formed with a bottom wall, side walls, and having an open top, said bottom wall being formed with a plurality of spaced openings therein located adjacent said side walls, an inner member positioned centrally of said container, a plurality of spaced partitions positioned in said container between said side walls and inner member and extending above said inner member to define a liquid distributing chamber, a substantial portion of the inner edge of each of said partitions engaging said inner member and said partitions being positioned between said spaced openings to define a plurality of cells, each of which has one of said openings located therein, and means positioned above said liquid distributing chamber for delivering liquid thereto, said chamber distributing said liquid to said cells in equal quantities, whereupon said liquid is thereafter dispensed in equal quantities from said container through said openings.

2. In liquid dispensing apparatus as set forth in claim 1, which further includes a support engaging the upper portions of said partitions and supporting said delivering means therein centrally of said liquid distributing chamber.

3. In a liquid dispenser, a container, an inner member positioned in said container, a plurality of partitions positioned in said container in spaced relation, a substantial portion of the inner edges of said partitions engaging said inner member for defining a plurality of liquid receiving cells, said container including a bottom wall having a plurality of openings formed therein, each of said openings being positioned in a liquid receiving cell, a plurality of dispensing tubes secured to said bottom wall and communicating with said openings, and means positioned above said cells for delivering liquid into said cells in equal proportions, said liquid thereafter being dispensed through said dispensing tubes.

4. In a liquid dispenser as set forth in claim 3, wherein said delivering means includes a resiliently biased valve for metering a predetermined amount of liquid into said container.

5. In a liquid dispenser as set forth in claim 3, wherein said inner member has a conically shaped top wall for directing said liquid from said delivering means to said cells in equal proportions.

6. In a liquid dispenser, a container including a bottom wall, an inner member located in said container in engagement with said bottom wall and positioned coaxially therewith, a plurality of partitions positioned in said container in spaced relation and engaging said inner member, each of said partitions having an inner edge engaging said inner member and extending along the entire length thereof, said partitions defining a plurality of liquid receiving cells, said bottom wall having a plurality of openings formed therein, each of said openings being positioned in a liquid receiving cell, and a plurality of dispensing tubes secured to said bottom wall and communicating with said openings, said dispensing tubes receiving liquid from said cells for dispensing thereof in equal proportions.

7. In a liquid dispenser, a container, a plurality of partitions positioned in said container in spaced relation and defining a plurality of liquid receiving cells, said container including a bottom wall having a plurality of openings formed therein, each of said openings being positioned in a liquid receiving cell, a plurality of dispensing tubes secured to said bottom wall and communicating with said openings, an inner member positioned centrally in said container, each of said partitions having a projecting tongue engaging the top wall of said inner member and cooperating with said inner member for directing said liquid into said cells, and means positioned above said cells for delivering liquid into said cells in equal proportions, said liquid thereafter being dispensed through said dispensing tubes.

8. In a liquid dispenser, a container including a bottom wall, an inner member located in said container in engagement with said bottom wall and positioned coaxially therewith, a plurality of partitions positioned in said container in spaced relation and engaging said inner member, said partitions defining a plurality of liquid receiving cells, said inner member being truncated in configuration and said partitions having an inclined side engaging the inclined wall of said truncated member, said bottom wall having a plurality of openings formed therein, each of said openings being positioned in a liquid receiving cell, and a plurality of dispensing tubes secured to said bottom wall and communicating with said openings, said dispensing tubes receiving liquid from said cells for dispensing thereof in equal proportions.

9. In a liquid dispenser, a container, an inner member positioned in said container, a plurality of partitions positioned in said container in spaced relation, a substantial portion of the inner edges of said partitions engaging said inner member for defining a plurality of liquid receiving cells, said container including a bottom wall having a plurality of openings formed therein, each of said openings being positioned in a liquid receiving cell, said inner member being truncated and positioned centrally of said container, the edges of said partitions that engage said inner member being inclined and cooperating with said inner member for directing said liquid into said cells, a plurality of dispensing tubes secured to said bottom wall and communicating with said openings, and means positioned above said cells for delivering liquid into said cells in equal proportions, said liquid thereafter being dispensed through said dispensing tubes.

10. In a liquid dispenser, a container including a bottom wall, a truncated inner member located in said container in engagement with said bottom wall and positioned coaxially therewith, a plurality of partitions positioned in said container in spaced relation and engaging said inner member, each of said partitions having an inner edge engaging the inclined side of said truncated inner member and extending along the entire length thereof, said partitions defining a plurality of liquid receiving cells, said bottom wall having a plurality of openings formed therein, each of said openings being positioned in a liquid receiving cell, and a plurality of dispensing tubes secured to said bottom wall and communicating with said openings, said dispensing tubes receiving liquid from said cells for dispensing thereof in equal proportions.

References Cited in the file of this patent

UNITED STATES PATENTS

| Number | Name | Date |
|---|---|---|
| 350,675 | Hathaway | Oct. 12, 1886 |
| 553,734 | Iredale | Jan. 28, 1896 |
| 791,425 | Johnson | May 30, 1905 |
| 1,202,439 | Scott | Oct. 24, 1916 |
| 1,296,300 | McCabe | Mar. 4, 1919 |
| 2,169,779 | Loewe | Aug. 15, 1939 |